United States Patent
Day, III et al.

(10) Patent No.: US 6,249,849 B1
(45) Date of Patent: Jun. 19, 2001

(54) "FAIL-SAFE" UPDATING OF REDUNDANT DATA IN MULTIPLE DATA STORAGE LIBRARIES

(75) Inventors: Kenneth Fairclough Day, III; Douglas William Dewey, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/334,180

(22) Filed: Jun. 16, 1999

(51) Int. Cl.[7] .............................. G06F 12/00; G06F 15/16
(52) U.S. Cl. .................. 711/161; 709/248; 707/201; 711/112
(58) Field of Search ........................... 711/112, 114, 711/111, 161, 162, 150; 707/201, 204, 10; 709/248, 400

(56) References Cited

U.S. PATENT DOCUMENTS

| | | | |
|---|---|---|---|
| 4,814,971 | 3/1989 | Thatte | 364/200 |
| 5,148,432 | 9/1992 | Gordon et al. | 371/10.1 |
| 5,408,470 | * 4/1995 | Rothrock et al. | 370/261 |
| 5,435,004 | 7/1995 | Cox et al. | 395/575 |
| 5,446,871 | * 8/1995 | Shomler et al. | 714/1 |
| 5,504,883 | 4/1996 | Coverston et al. | 395/600 |
| 5,574,849 | * 11/1996 | Sonnier et al. | 714/12 |
| 5,602,851 | 2/1997 | Terashita et al. | 370/403 |
| 5,603,019 | 2/1997 | Kish | 395/621 |
| 5,628,023 | 5/1997 | Bryant et al. | 395/800 |
| 5,689,706 | * 11/1997 | Rao et al. | 707/201 |
| 5,771,354 | 6/1998 | Crawford | 395/200.59 |

(List continued on next page.)

OTHER PUBLICATIONS

Zeng, X. et al., GloMoSim: A Library for Parallel Simulation of Large–Scale Wireless Networks, IEEE Workshop on Parallel and Distributed Simulation, pp. 154–161, May 1998.*

Rao et al., "A Transparent Service for Synchronized Replication Across Loosely–Connected File Systems", Workshop on Services in Distributed and Networked Environments, pp. 110–117, Jun. 1995.*

(List continued on next page.)

*Primary Examiner*—Matthew Kim
*Assistant Examiner*—Pierre Michael Bataille
(74) *Attorney, Agent, or Firm*—Robert M. Sullivan; John H. Holcombe

(57) ABSTRACT

Identifying most recent redundant copies of identifiable data volumes stored in a plurality of data storage libraries which are coupled to a plurality of directors. To update a data volume, an initiating director attempts to set a current token "inconsistent" flag to potentially down level copies of the data volume on each lagging library. Upon failing to receive notification of any successful setting of the current token "inconsistent" flag from any of the lagging libraries, the director forwards the request to the other directors, which attempt to set the current token "inconsistent" flag for the volume at any lagging library from which no notification has been received. Upon all of the other directors responding to the initiating director, and upon the other directors indicating failure to set the "inconsistent" flag at the lagging library, all the directors list the volume and a new token as an entry in a "hot token" list. The initiating director allows updating only the data volume for which the initiating director has received the notification of posting the "inconsistent" flag for all of the lagging libraries, or the new token has been listed in the "hot token" list of each director.

15 Claims, 12 Drawing Sheets

U.S. PATENT DOCUMENTS

| | | | |
|---|---|---|---|
| 5,819,310 | | 10/1998 | Vishlitzky et al. ............... 711/114 |
| 5,884,325 | * | 3/1999 | Bauer et al. ..................... 707/201 |
| 5,893,116 | * | 4/1999 | Simmonds et al. ............... 707/201 |
| 5,895,493 | * | 4/1999 | Gatica ............................. 711/147 |
| 5,924,094 | * | 7/1999 | Sutter .............................. 707/10 |
| 5,924,096 | * | 7/1999 | Draper et al. .................... 707/10 |
| 5,926,816 | * | 7/1999 | Bauer et al. ..................... 707/8 |
| 5,956,489 | * | 9/1999 | Andres et al. .................... 709/221 |
| 5,978,813 | * | 11/1999 | Foltz et al. ...................... 707/201 |
| 6,000,000 | * | 12/1999 | Hawkins et al. ................. 707/201 |
| 6,052,797 | * | 4/2000 | Ofek et al. ....................... 714/6 |
| 6,061,741 | * | 5/2000 | Murphy, Jr. et al. ............. 709/248 |
| 6,065,018 | * | 5/2000 | Beier et al. ...................... 707/202 |

OTHER PUBLICATIONS

Fault–Tolerant Clock Synchronization In Distributed Systems, Ramanatham et al., IEEE Computer Magazine, 10/90, pp 33–42.

Implementing Fault–Tolerant Services Using The State Machine Approach: A Tutorial, Schneider, ACM Computing Surveys, v22 n04, 12/90, pp 299–319.

* cited by examiner

| LIBRARY 1 | | |
|---|---|---|
| DATA VOLUME | SYNCH TOKEN | "INC" FLAG |
| 0001 | 001 | 0 |
| 0002 | 006 | 0 |
| 0003 | 008 | 0 |

| LIBRARY 2 | | |
|---|---|---|
| DATA VOLUME | SYNCH TOKEN | "INC" FLAG |
| 0001 | 001 | 0 |
| 0001 | 005 | 1 |
| 0003 | 008 | 0 |

"HOT TOKEN" LIST

| DATA VOLUME | SYNCH TOKEN | LAGGING LIBRARY |
|---|---|---|
| 0003 | 009 | 2 |

*FIG. 6*

VOLUME TABLE

| DATA VOULUME | OK - FAIL LIB1 LIB2 | | ADV - LAG LIB1 LIB2 | | TOKEN/FLAG LIB1 LIB2 CURR | | | SAFE |
|---|---|---|---|---|---|---|---|---|
| 0003 | 1 | 0 | 1 | 0 | 008/0 | 0 | 008/0 | 0 |

*FIG. 7*

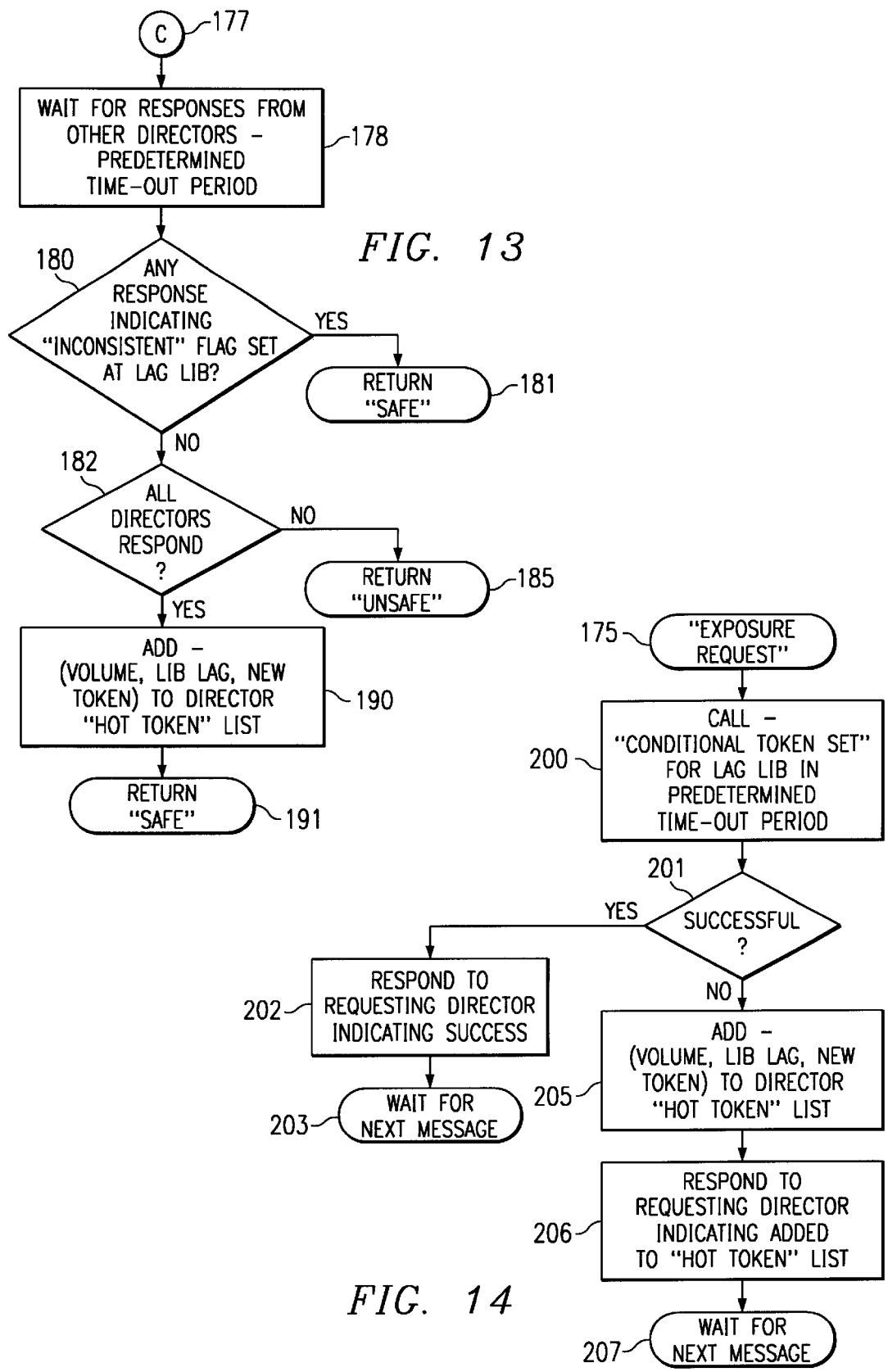

"FAIL-SAFE" UPDATING OF REDUNDANT DATA IN MULTIPLE DATA STORAGE LIBRARIES

DOCUMENTS INCORPORATED BY REFERENCE

Commonly assigned U.S. patent application Ser. No. 09/283,223 K. F. Day et al. is incorporated for its showing of a data storage library system having directors for storing and tracking multiple copies of data in system data storage libraries.

Commonly assigned U.S. patent application Ser. No. 09/332,010, K. G. Dahman et al., is incorporated for its showing of an indirect means of communicating between directors of the Day III et al. data storage library system.

FIELD OF THE INVENTION

This invention relates to storage of data on rewritable data storage media which is accessible in data storage libraries, and, more particularly, to updating the redundant data stored in a plurality of data storage libraries.

BACKGROUND OF THE INVENTION

Data processing systems comprising at least one host typically require a large amount of data storage. If the data, typically stored as a data volume, is not immediately required by the hosts, for example, if the data volume is infrequently accessed, the storage of the data volume may be on removable rewritable data storage media, such as magnetic tape or optical disk, and the data volumes may be written and or read by means of a data storage drive.

The data storage drive is typically coupled to the host, or processing unit, by means of a peripheral interface in which commands are directed only from the processing unit to the data storage drive, and the data storage drive responds to those commands, performing the commanded functions. No commands can be sent by the data storage drive to the coupled processing unit. Typically, the commands are performed by a device controller.

Data processing systems having multiple hosts require larger amounts of data storage than can be efficiently handled by single data storage drives.

Data storage libraries typically provide efficient access to large quantities of data volumes stored in removable data storage media, the media stored in storage shelves which are accessed by robots under the control of robot controllers. Due to the large amount of stored data, typically, a plurality of hosts make use of the same data storage library, and a plurality of data storage drives are included in the library to allow access by the hosts. A library manager, which may comprise the same processor as the robot controller, typically tracks each data volume and the data storage media on which it is stored, and tracks the storage shelf location of each data storage media.

Herein, a library manager, either with or without the robot controller, is defined as a "controller" for the data storage library, as is the "controller" for a data storage device as discussed above.

An example of a data storage library system for redundantly storing and accessing data volumes stored on removable data storage media in a plurality of data storage libraries is described in the incorporated coassigned K. F. Day III et al application. The library controller of each library provides an updatable synchronization token directly associated with each data volume. A plurality of directors are provided, each separate from and coupled to the hosts and each separate from and coupled to each data storage library. Each director responds to separate, partitioned data storage drive addresses addressed by the hosts. The responding director supplies each data volume supplied from a host to all of the data storage libraries, and updates each synchronization token directly associated with the supplied data volume. Thus, the directors store duplicate copies of the data volume in the data storage libraries without involvement by the host. In most data processing applications, it is critical to access the most current data. Hence, the currency of the data volumes are each tracked by means of the directly associated synchronization token, and the synchronization token is not tracked by the host.

In the instance where one copy of the data volume is down level and the corresponding synchronization token has not been updated, the responding director compares the tokens from all the libraries to identify the down level data volume, so that the erroneous down level information is not transferred to hosts. The responding director may then update the most current data volume and the corresponding synchronization token and the previously down level volumes are also updated.

If, as a data volume is being updated at one of the libraries, another of the libraries is or goes temporarily out of service, or out of communication with the directors, the data volume at that library cannot be updated. Thus, when the copy of the data volume on the operating library is updated, that volume is exposed, in that one copy will be more current than another. Later access to the data, and conducting the comparison of the tokens, will note the lack of consistency of the data, but if the library having the most current copy is then temporarily out of service, or out of communication with the directors, there will be no ability to note that the accessed data is down level so long as the library is out of service, etc. Further, the down level data may be further updated without knowledge that it is down level, and its token updated, so that the updated data may be lost forever.

SUMMARY OF THE INVENTION

An object of the present invention is to allow a data volume to be updated only when the various updating levels of the volume will be identified to all of the directors or indicated in the token on the libraries with the other copies.

Disclosed are a data storage library subsystem, wherein the data storage libraries are coupled to a plurality of directors, and a method for identifying most recent redundant copies of identifiable data volumes stored in a plurality of data storage libraries, wherein at least one of the redundant copies may be initially updated with respect to other of the redundant copies, the identifiable data volumes accessible in the plurality of data storage libraries. The one of the data storage libraries first updating the copy is called the advancing library, and the later of the data storage libraries updating the copy is each called a lagging library. The identifiable data volumes are each directly associated with an updatable synchronization token, the synchronization token indicating the relative update levels of the directly associated redundant copies. Due to unavailability of a library or of communication between a library and the directors, the copies and the directly associated tokens may be unavailable to the directors at various times.

The present method, in response to a command to update a data volume, attempts to set, by an initiating one of the directors, an "inconsistent" flag to the current token directly associated with potentially down level copies of the data volume on each lagging library. Then, the initiating director receives notification of any successful setting of the current token "inconsistent" flag by the lagging libraries, within a predetermined time-out period. Upon the initiating director, as the result of the lagging library notification receiving step, failing to receive the notification from any of the lagging libraries, the initiating director forwards to each other director available to the initiating director, a request to set the current token "inconsistent" flag for the volume at any lagging library from which no notification has been received. Then, the initiating director receives notification from the other directors of any successful setting and of failure to set the current token "inconsistent" flag of the lagging libraries for which no notification had been received by the initiating director, within a predetermined time-out period. Upon all of the other directors responding to the initiating director in the flag notification receiving step, and upon the other directors indicating failure to set the "inconsistent" flag at the lagging library, the initiating director lists the volume and a new token as an entry in a "hot token" list at the initiating director. The initiating director allows updating only the data volume for which the initiating director has received the notification of posting the "inconsistent" flag for all of the lagging libraries, or the new token has been listed in the "hot token" list at each director.

Additionally, in each of the other directors, upon receiving from the initiating director the forwarded request to set the current token "inconsistent" flag for the volume at any lagging library from which no notification has been received, the director attempts to set the current token "inconsistent" flag for the data volume on the lagging library. The director receives notification of any successful setting of the current token "inconsistent" flag by the lagging library, within a predetermined time-out period. Upon failing to receive the notification from the lagging library, the other director lists the volume and the new token as an entry in a "hot token" list at the other director. The other director then responds to the initiating director, sending notification of any successful setting and of failure to set the current token "inconsistent" flag of the lagging library for which no notification had been received by the initiating director within the predetermined time-out period.

Thus, no data volume will be updated unless and until the data volume is identified as "inconsistent" at all lagging libraries, or is on the "hot token" list of each director.

For a fuller understanding of the present invention, reference should be made to the following detailed description taken in conjunction with the accompanying drawings.

BRIEF DESCRIPTION OF THE DRAWINGS

FIG. 6 is a diagrammatic representation of a "hot token" list in accordance with the present invention that may be employed in the directors of the data storage library subsystem of FIG. 1;

FIG. 7 is a diagrammatic representation of a volume table in a director of the data storage library subsystem of FIG. 1; and FIGS. 8–18 are detailed flow charts depicting an embodiment of a method in accordance with the present invention.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
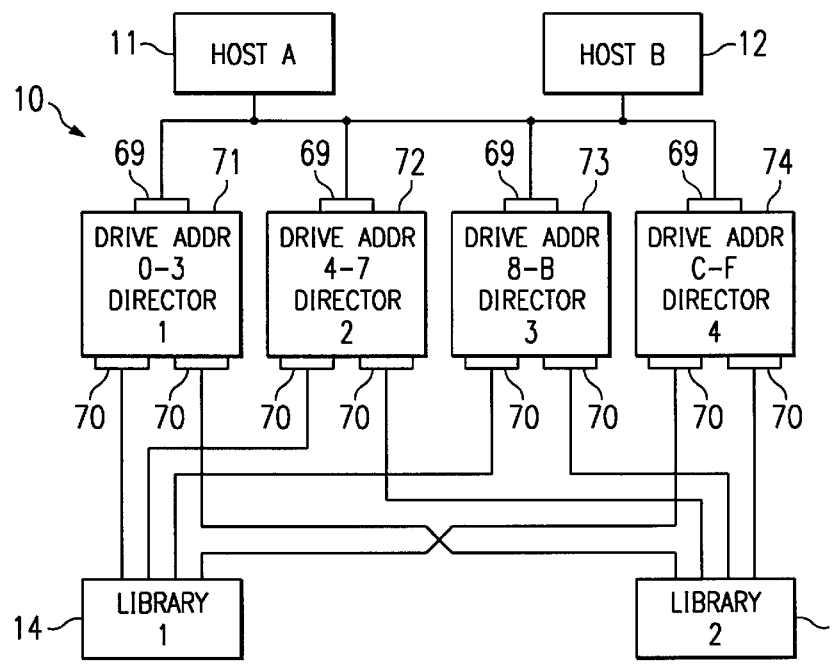
FIG. 1 is a block diagram showing interconnection of functional components of a data storage library subsystem in accordance with an embodiment of the present invention.

Referring to FIG. 1, an embodiment of a data storage library system 10 is illustrated which redundantly couples host systems 11 and 12 to data storage libraries 14 and 15, via a plurality of directors 71–74, in accordance with the incorporated Day III et al. application. The Day III et al. application provides each redundant copy of the data volume with a directly associated synchronization token. The present invention allows a data volume redundantly stored in the libraries 14 and 15 to be updated only when the potential down level status of the volume on the lagging library is identified to all of the directors 71–74. Thus, should the lagging library or a director become non-operational as the data is being written to the advancing library and before the data is written to the lagging library, the various levels of the data volume on the libraries is known, providing a "fail-safe" updating of the data volume.

The host systems 11 and 12 may be embodied by a variety of types and numbers of processing units, servers, or computing systems. The data storage libraries 14 and 15 may comprise any similar libraries for storing removable rewritable data storage media, such as tape cartridges or optical disks. An example of a suitable data storage library is the IBM 3494 Virtual Tape Storage System. More than two data storage libraries 14–15 may be provided, and one library is the selected "advancing" library at which the data volume is first updated, and its synchronization token is updated. The remaining library or libraries are thus the "lagging" libraries at which the data volume is subsequently updated.

Figure 2:
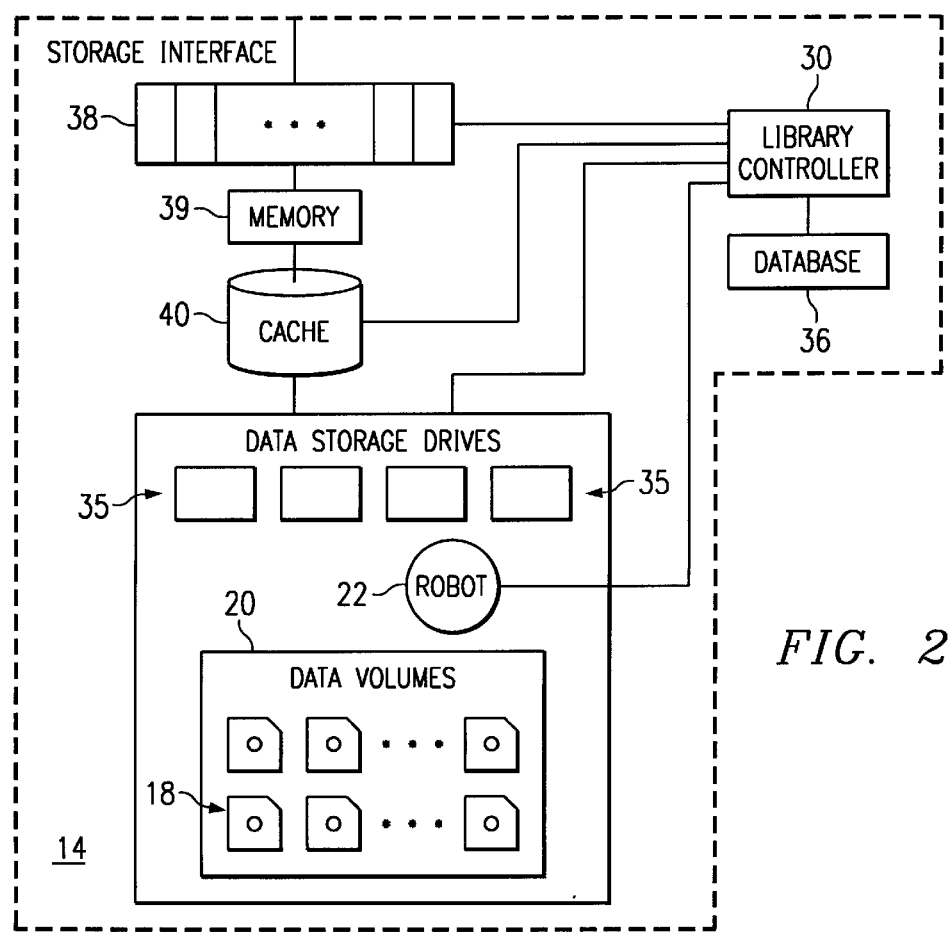
FIG. 2 is a block diagram showing function components of an example of a data storage library of FIG. 1.

Referring additionally to FIG. 2, data storage libraries 14 and 15 provide storage and access to large quantities of data volumes 18 stored in removable data storage media, the media stored in storage shelves 20 which are accessed by at least one robot 22 under the control of a library controller 30. A plurality of data storage drives 35 are included in the library to allow access to read and/or write data volumes 18. The library controller 30 may include a library manager which utilizes a database 36 to track each data volume and the data storage media on which it is stored, and to track the storage shelf location 20 of each data storage media. Communication with the library is conducted at a storage interface 38.

A host typically communicates with a data storage library to access an identified data volume, and provides the address of the particular data storage drive 35 that the host desires that the data volume be delivered to. The library controller 30 identifies the data storage media and the storage shelf 20 containing the data volume. The library controller then operates the robot 22 to access the data storage media from the storage shelf and to deliver the data storage media to the addressed drive 35. When the data storage media containing the identified data volume 18 is delivered to the addressed drive, and physically mounted on the drive, the library controller 30 provides a "READY" signal at storage interface 38 to the addressing host. The data volume is then typically read and/or written by the addressing host via data transfer at the storage interface 38.

Figures 3, 4A, 4B:
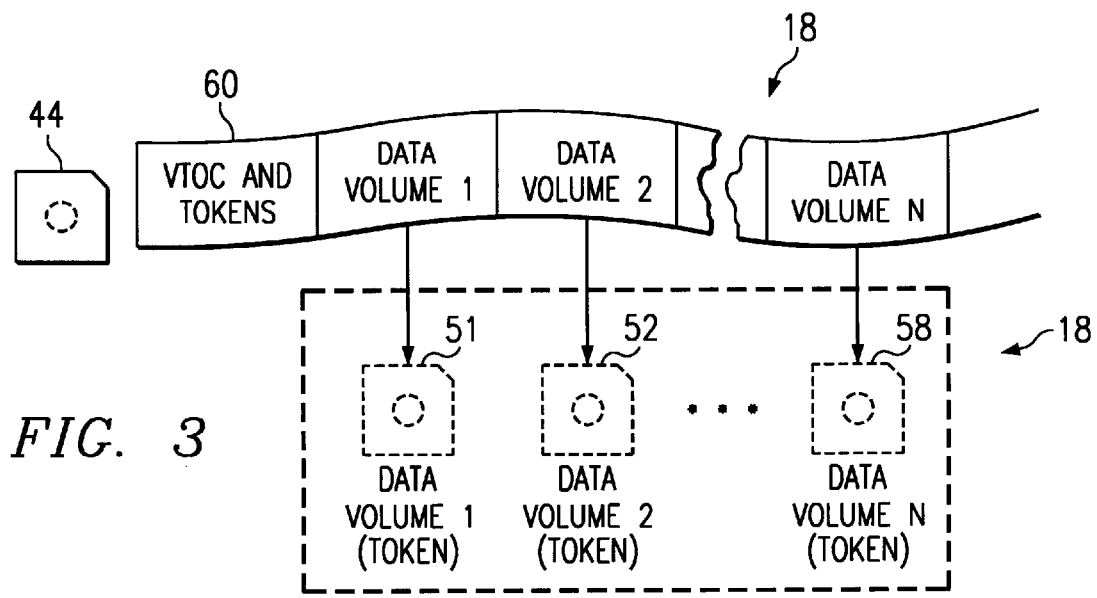
FIG. 3 is a generalized diagram of logical data volumes stored on a single physical volume for use in a data storage library of FIGS. 1 and 2.
FIGS. 4A and 4B are diagrammatic representations of tables relating data volumes to synchronization tokens and "inconsistent" flags in accordance with the present invention that may be employed in the data storage library subsystem of FIG. 1.

The assignee of the present invention has introduced tape libraries which are Virtual Tape Servers for handling data transfers with tape drives functioning with high bursts of activity, and for quickly transferring data to a library without waiting for the data storage media to be loaded. The hosts address desired tape drives 35 in the library, but the Virtual Tape Server actually has a cache memory 40 which is treated as though it is a number of tape drives with mounted media. The cache memory tape drives are "virtual drives". Thus, when a host processor reads a data volume 18 from a tape, it remains stored as a file in the cache memory 40 at an address of the virtual drive. Similarly, when a host migrates data volumes to a tape drive, the data volumes are first stored at the cache memory virtual drive 40 and then stored in the tape media at a library tape drive 35. The data remains in the cache memory 40 for a period of time, managed by the Virtual Tape Server library controller 30, and is available for immediate access by the host without waiting for the tape media to be accessed by the robot 22 and mounted on the library tape drive 35. Typically, in removable data storage systems, a plurality of data volumes 18 are stored on a single physical data storage media, called a physical volume. FIG. 3 is a schematic representation of a physical volume 44, such as a magnetic tape in a cartridge, which contains N logical volumes, thereby placing N individual tape cartridges 51 through 58. The storage of multiple logical data volumes in a single physical volume is called "volume stacking". In one configuration, a single physical volume can include up to 140 logical volumes of 50 MB each, each of which can be individually addressed and accessed. In another configuration a single physical volume can include a variable number of logical data volumes of variable size, each of which can be individually addressed and accessed. Herein, a data volume 18 may comprise a logical volume 51, etc., or, if no logical volumes are provided, a data volume 18 may comprise a physical volume 44.

The key identifier for both logical data volumes and physical volumes is the "Volume Serial Number" or "VOLSER", comprising a predetermined number of characters or blanks. Most physical volumes have the VOLSER, or a similar identifier which is translatable to a VOLSER, encoded in a label which is on the side of the media (cartridge) which is readable by the library robot. Thus, physical volume 44 will have a VOLSER as will the logical data volumes 51 through 58. The typical data storage media 44 includes an index or a volume table of contents (VTOC) 60 which identifies each of the data volumes 18 stored on the physical volume.

In accordance with the incorporated Day III et al. application, the library controller 30 provides a synchronization token directly associated with each data volume, the synchronization token comprising an updatable token. Referring to FIG. 3, the synchronization tokens may be directly associated with data volumes 18 by storing the tokens with the VTOC 60 for each physical volume 44, or alternatively may be stored directly with each data volume 51–58. Referring to FIGS. 4A and 4B, the synchronization tokens may be stored in tables 61 and 62 with each library 15 and 14, respectively, in the database 36 of the library controller 30. The data volumes are each identified, for example, by its VOLSER in column 65, and the directly associated synchronization token is in column 66 in the same row as the VOLSER.

Referring to FIG. 1, the plurality of directors 71–74 are provided, each separate from and coupled to the hosts 11–12 and each separate from and coupled to each data storage library 14–15. Each director responds to separate, partitioned data storage drive addresses addressed by the hosts. For example, director 71 responds to drive addresses 0–3, director 72 responds to drive addresses 4–7, director 73 responds to drive addresses 8-B, and director 74 responds to drive addresses C-F.

Each director 71–74 is a data processor with interfaces appropriate to the connections to the hosts 11–12 and to the libraries 14–15, such as ESCON or SCSI, but without a display, and comprises, for example, an IBM RS-6000 processor.

The responding director 71–74 additionally responds to a data volume 18 supplied by the addressing host 11–12, in turn supplying the data volume 18 to all of the plurality of data storage libraries 14–15, and the responding director 71–74 updates each synchronization token directly associated with the supplied data volume.

The synchronization tokens may comprise incrementable integers, which are updated by the responding director 71–74 by incrementing each synchronization token directly associated with the supplied data volume, e.g., in column 66 in both table 61 and in table 62 of FIGS. 4A and 4B. The responding director may increment each synchronization token directly associated with the same supplied data volume to the same integer value. The director may determine the integer value by comparing the previous integer value of each synchronization token directly associated with the supplied data volume, and setting the synchronization tokens to a value incremented beyond the most current integer value indicated by the comparison.

Thus, the directors 71–74 act as data storage drives with respect to the host 11–12, and store duplicate copies of the data volume 18 in the data storage libraries 14–15 without involvement by the host. The currency of the data volumes 18 are each tracked by means of the synchronization token, and the synchronization token is directly associated with the data volume 18, and is not tracked by the host 11–12.

Should one library 14–15 become unavailable, the responding director 71–74 may access the data volume 18 at another of the libraries without involvement by the host. Specifically, each director is separate from and coupled to each data storage library, such that even a complete failure of a library does not adversely affect the directors.

Each director is provided with an operating system and application programs for operating in accordance with the present invention. The application programs may comprise a computer program product, comprising computer readable program code. The computer program product may be supplied electronically, as from a network or one of the hosts 11–12 at a communications interface. Alternatively, the computer program product may be supplied at an I/O station of the processor or from a data storage library from a storage media which stores executable computer instructions, and comprises an article of manufacture, such as data storage media 44 in FIG. 3. Another example of a storage media which is an article of manufacture is a magnetic diskette. Other suitable storage media are optical disk cartridges, magnetic tape cartridges, removable hard disk cartridges, read only memories (ROM) or programmable read only memories (PROM). The requirement for the storage media or memories is that they store digital representations of computer executable instructions.

The directors 71–74 may communicate with one another indirectly through the libraries 14–15 as described by the incorporated Dahman et al. application, or may have direct communication lines (not shown).

Figure 5:
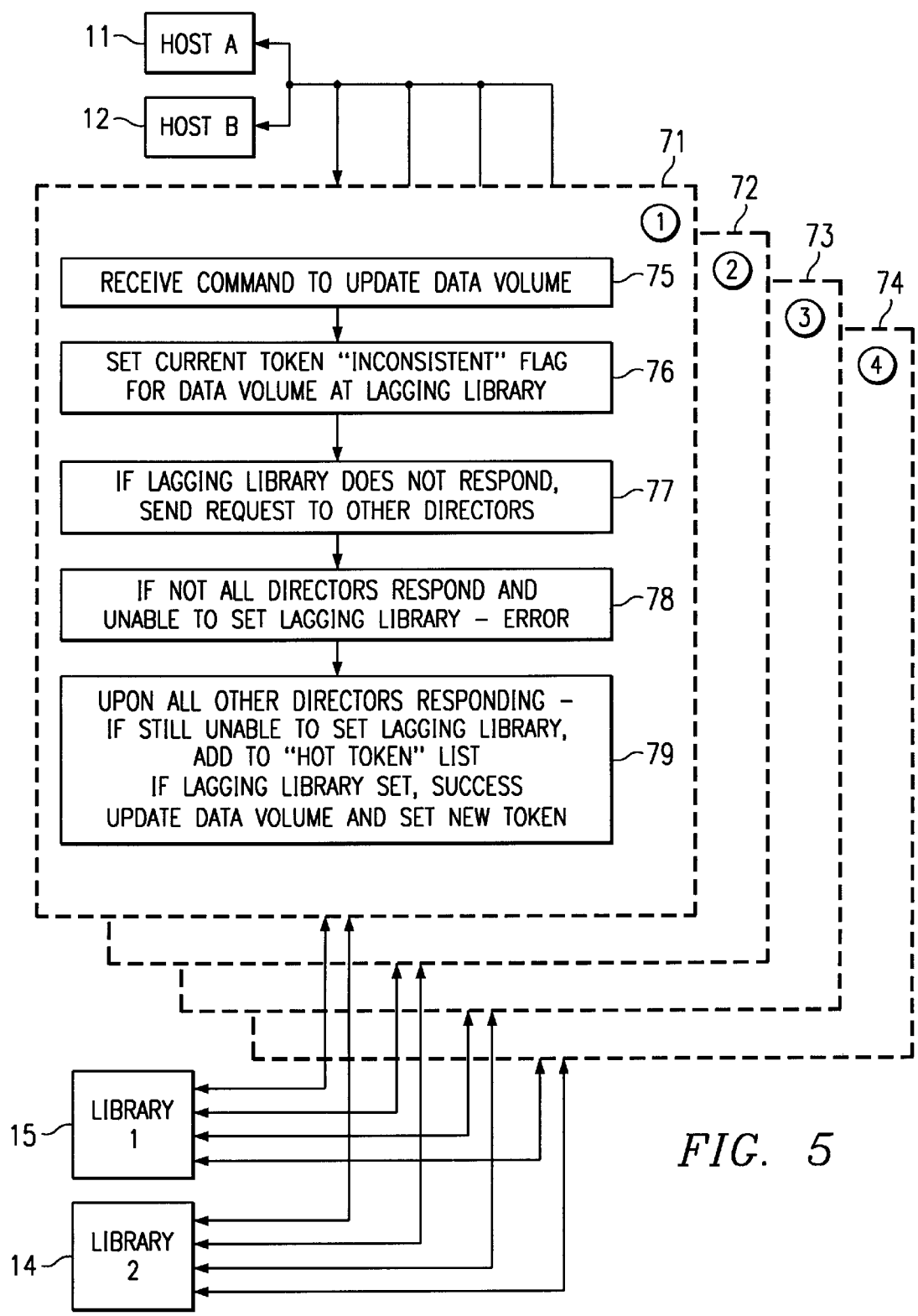
FIG. 5 is a flow chart depicting a generalized embodiment of a method of the present invention.

FIG. 5 depicts a generalized method in accordance with an embodiment of the present invention for providing a "fail-safe" updating of the data volume redundantly stored in the libraries 14 and 15. The method is best implemented as a computer program product for operating the programmable computer processors of the directors 71–74 in FIG. 2. As discussed above, computer program products may be supplied electronically, as from a network or one of the hosts 11–12 at a communications interface. The computer program product may alternatively be supplied at an I/O station of the processor or from a data storage library from a storage media which stores executable computer instructions, and comprises an article of manufacture, such as data storage media 44 in FIG. 3.

As discussed above, referring additionally to FIG. 1, the hosts 11–12 address the directors by data storage drive addresses, supply the data volumes to be stored and updated, and receive the accessed data volumes. The directors, in step 75, receive the command from a host to update an existing data volume that is redundantly stored in libraries 14 and 15. One of the directors 71–74 is selected, in accordance with the Day III et al. application, to be an "initiating" director 71. One of the libraries 14–15 is selected by the initiating director 71 to be the "advancing" library 14.

Referring additionally to FIGS. 4A and 4B, in accordance with the present invention, the initiating director 71 attempts, in step 76, to add an "inconsistent" flag 80 to the current synchronization token 66 directly associated with the potentially down level copy of the data volume on the lagging library 15. Then, the initiating director 71 receives notification of any successful setting of the "inconsistent" flag 80 of the current token 66 by the lagging library 15, within a predetermined time-out period. If the flag is set by the lagging library, it will be safe to update the data volume. However, upon the initiating director, as the result of the lagging library notification receiving step, failing to receive the notification from any of the lagging libraries, either the library 15 is out of operation, or communication between the library and the director is out. Hence, in step 77, the initiating director 71 forwards to each other director 72–74 available to the initiating director, a request to set the current token and the "inconsistent" flag for the volume at the lagging library 15 from which no notification has been received.

Then, the initiating director 71 receives notification from the other directors of any successful setting and of failure to set the current token 66 "inconsistent" flag 80 of the lagging libraries for which no notification had been received by the initiating director, within a predetermined time-out period. If one of the other directors 72–74 is able to set the current token "inconsistent" flag for the lagging library 15, and the other director informs the initiating director 71 that the flag has been set, again, it will be safe to update the data volume. If not all of the other directors 72–74 responded, as in step 78, the data volume would not be updated, and an error would be posted. The error would be the result of a lack of communication between one of the directors 72–74 and the initiating director 71. In accordance with the invention, the data volume is not updated since there would be an exposure to losing the synchronism between the redundant copies such that the updated information may be lost or the down level copy may be used as though it were the most current.

Referring additionally to FIGS. 6 and 7, a "hot token" list and a volume table for one of the directors are illustrated. The "hot token" list 85 provides the information used to identify the data volumes that are potentially down level in the lagging library, and which have not been given an "inconsistent" flag 80 or 81 by the lagging library. Thus, the "hot token" list 85 may comprise the data volume VOLSER 86, the new synchronization token 87, and the identifier of the lagging library 88. The volume table 90 tracks the status of the data volume at the various libraries. Thus, the volume table 90 may comprise the data volume VOLSER 91, the status of each of the two libraries 92, the identification of the lagging and the leading libraries 93, the token at each of the libraries and the identification of the current token and its "inconsistent" flag in column 94, and an identification of whether it is safe to update a data volume in column 95.

Referring to FIGS. 5–7, in step 79, upon all of the other directors 72–74 responding to the initiating director 71 in the flag notification receiving step, and upon the other directors indicating failure to set the "inconsistent" flag at the lagging library, the initiating director lists the volume and a new token as an entry in a "hot token" list 85 at the initiating director. The "hot token" list entry includes the data volume identifier VOLSER 86, the next synchronization token 87, and additionally identifying 88 the lagging library 15. Each of the responding directors will also have placed an entry in its "hot token" list. The initiating director 71 then indicates that it is safe 95 to update the data volume, and the director updates the data volume.

Thus, only the data volume for which the initiating director has received the notification of posting the "inconsistent" flag for all of the lagging libraries, or the new token has been listed in the "hot token" list at each director, is updated. In this manner, only when there is clear assurance that the potentially down level data volume at the lagging library (libraries) is identified either by means of the "inconsistent" flag or by means of the "hot token" list, is the data volume at the advancing library updated. Any subsequent failure or loss of communication with respect to any of the libraries will not result in accidental use of the down level data volume as though it were the most current.

FIGS. 8–18 are detailed flow charts depicting an embodiment of a method in accordance with the present invention.

Figure 8:
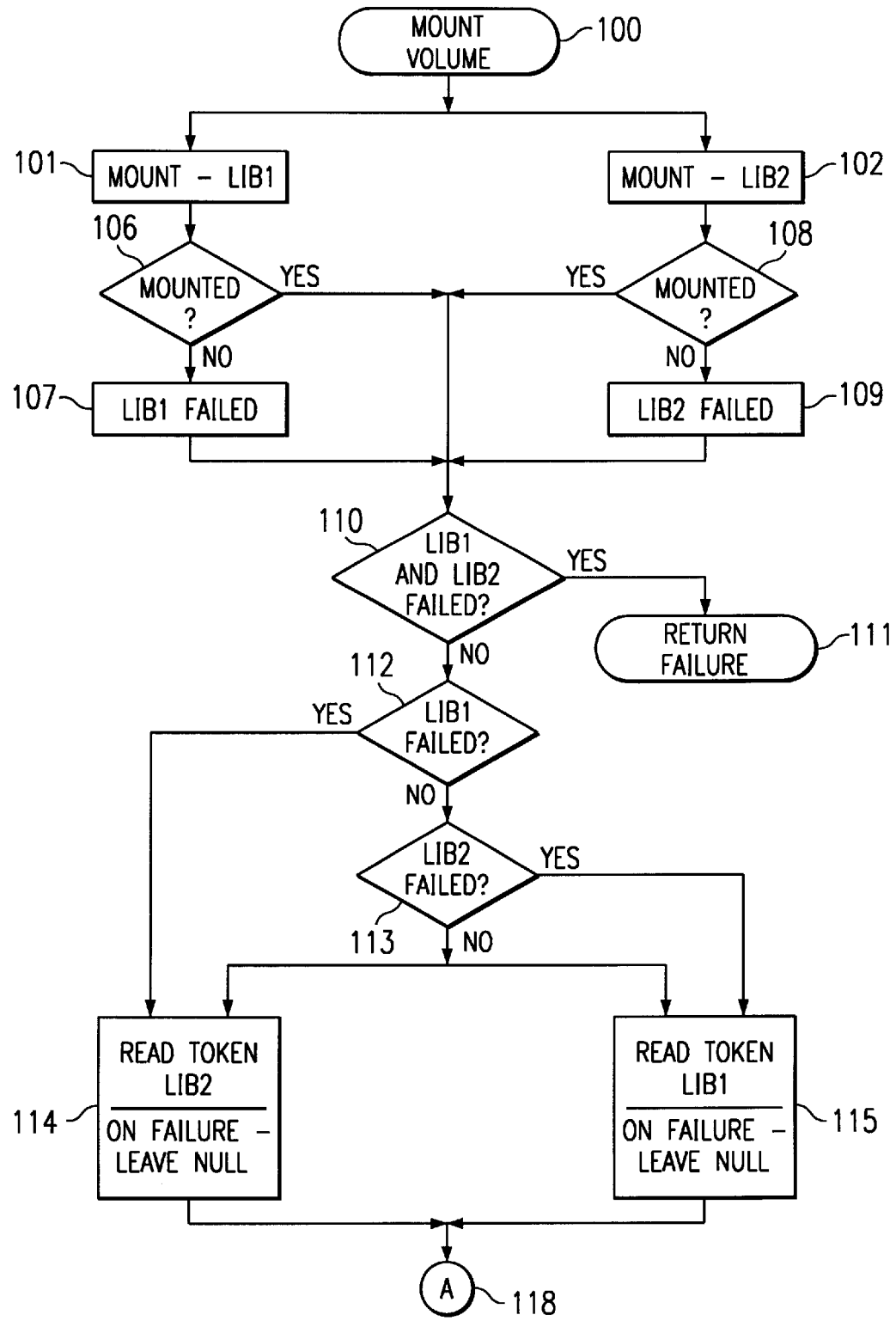
Figure 9:
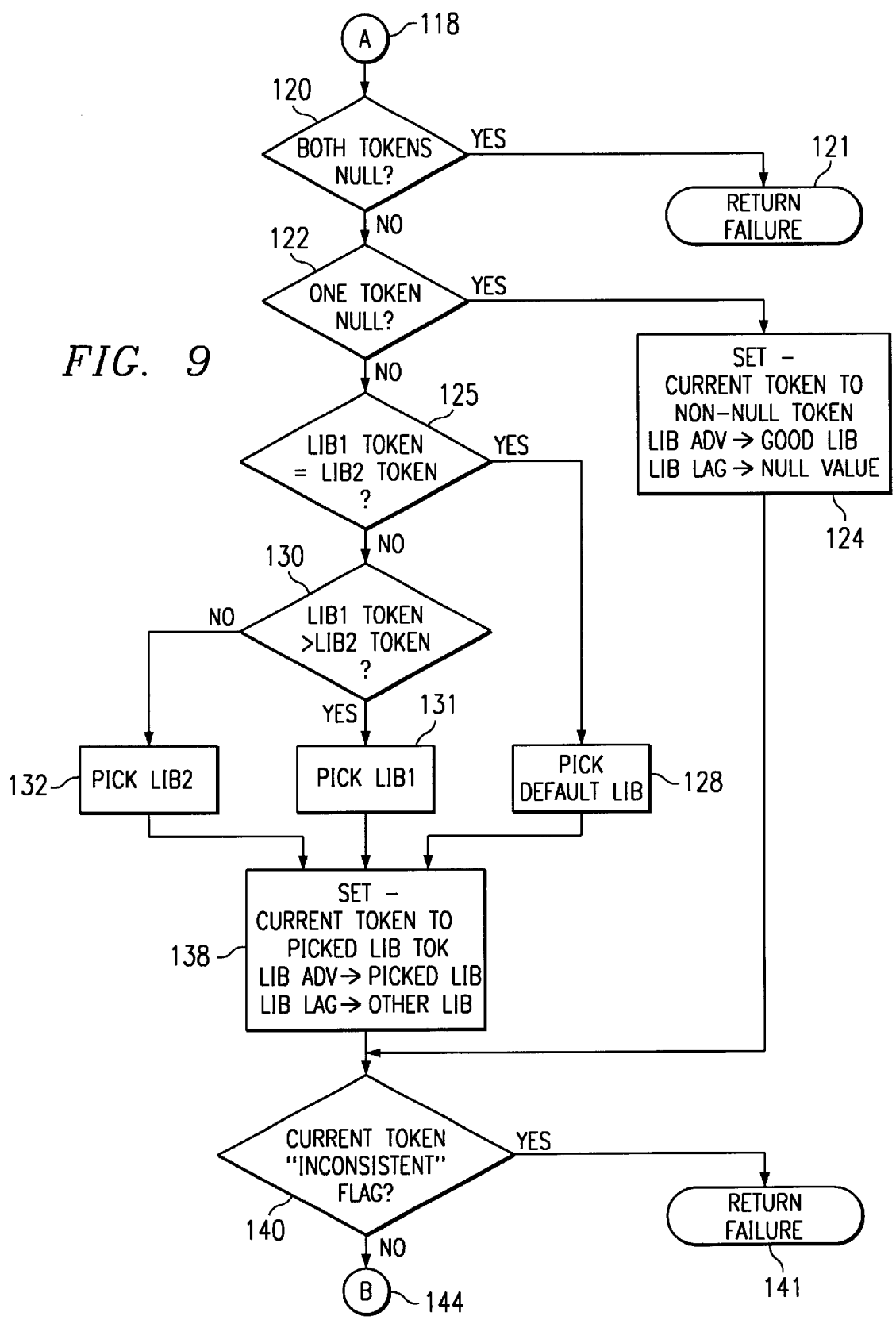
Figure 10:
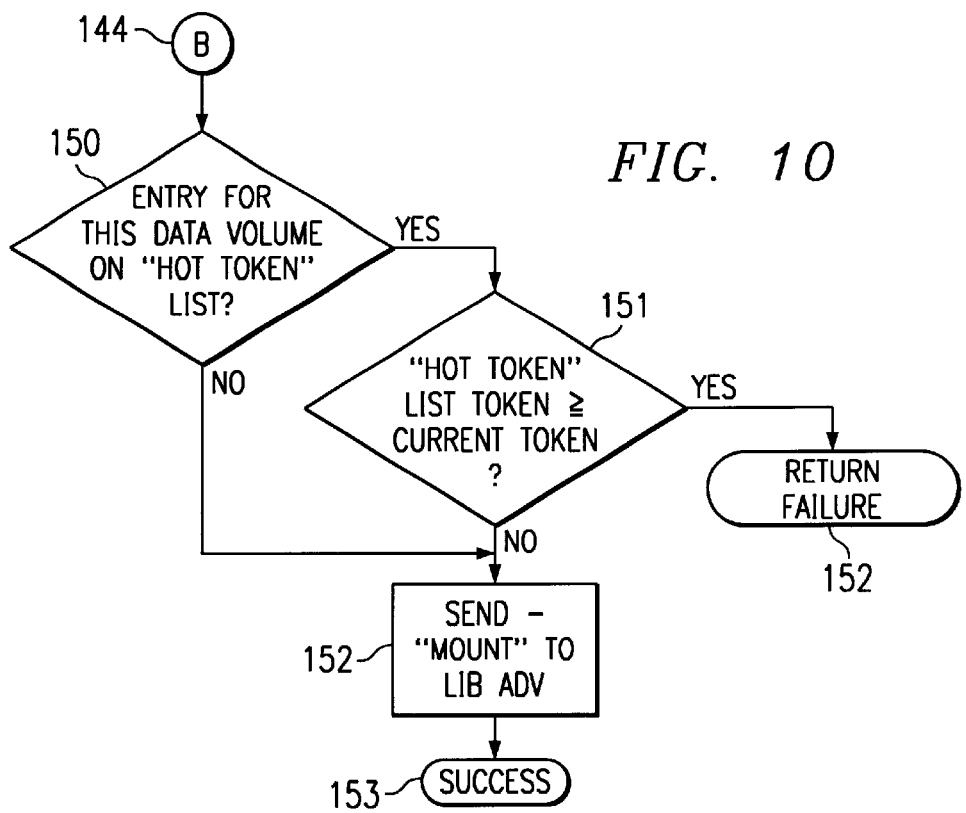

Referring to FIGS. 8–10, the data storage library subsystem of FIGS. 1 and 2 "mounts" a data volume in response to a command from a host 11–12, received in step 100. In accordance with the incorporated Day III et al. application, the mount command is provided by one of the directors 71–74, e.g., director 71, to library 14 in step 101, and to library 15 in step 102. Each library will "mount" the data volume by finding the data volume in its cache 40 or the library robot 22 will access the physical volume 18 containing the data volume from its storage shelf 20 and will mount the physical volume on a data storage drive 35.

The initiating director determines, in step 106, whether the library 14 has responded that the data volume was "mounted". If not, the library has failed, as depicted by step 107, and the success or failure is posted by the director in column 92 in table 90 of FIG. 7. Similarly, the initiating director determines, in step 108, whether the library 15 has responded that the data volume was "mounted". Again, if not, the library has failed as depicted by step 109, and the corresponding posting is in column 92 in table 90. Step 110 determines whether both library 14 and library 15 failed as determined by steps 107 and 109. If so, there is no access to the data volume at any library, and step 111 returns a failure code to the host.

Upon step 110 indicating that at least one library was successful, steps 112 and 113 determine which of the libraries, or both, were successful, and select the successful library or libraries to read the token associated with the data volume, in steps 114 and 115, providing the tokens to column 94 in table 90 of FIG. 7. If either of the libraries was unsuccessful, the token is identified as null, or "0". The process then proceeds, via connector 118, to FIG. 9.

The stored tokens thus indicate whether the library successfully located the data volume and provided the synchronization token directly associated with the data volume, or that the library failed and the director set the token to a null. Step 120 determines whether both tokens were set to null.

If so, both libraries have failed to find the data volume, and the director returns a failure code to the host in step 121.

If at least one token is not null, "NO", in step 120, step 122 determines if one of the tokens is null. If so, step 124 sets the current token in column 94 of table 90 of FIG. 7 to the value of the non-null token, sets the library advancing in column 93 as the library having the non-null token, by setting the value for that library to "1", and setting the library lagging as the library having the null token, by setting the value for that library to "0".

If neither token was null in step 122, the most current synchronization token must be determined. Thus, step 125 determines whether the two tokens are equal. If they are equal, the most current token is either token, and either library may be picked as the advancing library. A default mechanism is employed to pick one of the libraries in step 128. If the synchronization tokens are unequal, the token with the greater value is the most current. Thus, step 130 determines whether the library 1 token is greater than the library 2 token. If the library 1 token is greater, library 14 has the most current copy of the data volume and is picked in step 131. If the library 2 token is greater, "NO" in step 130, library 15 has the most current copy of the data volume and is picked in step 132. In step 138, the library picked in either of steps 128, 131 or 132 is the library that has the most current copy of the data volume as indicated by the synchronization tokens. Thus, step 138 sets the current token in column 94 of table 90 of FIG. 7 to the value of the token of the picked library, sets the library advancing in column 93 as the picked library, by setting the value for that library to "1", and setting the library lagging as the library that was not picked, by setting the value for that library to "0".

Step 140 determines whether the most current synchronization token of column 94 for the data volume has the "inconsistent" flag set. If so, "YES", the most current copy may be down level, and step 141 therefore returns a failure code to the requesting host. If the current token has no "inconsistent" flag, the data volume is the most current, and the process then proceeds, via connector 144, to FIG. 10.

In step 150, the initiating director determines whether there is an entry for the data volume in the "hot token" list of the director. If there is an entry, "YES", step 151 determines whether the token value in the "hot token" list is greater than or equal to the current synchronization token directly associated with the data volume from the picked library. If so, the data volume in the picked library may be down level and is not a more current copy that would have a token that overrode the entry on the "hot token" list. Therefore, step 152 provides a failure return code to the host.

If either step 150 indicates that there is no entry for the data volume in the "hot token" list for the director, or step 151 indicates that the "hot token" list entry has a lower value token than the current token, the data volume is the most current. Hence, step 152 sends the "mount" command to the advancing library, and step 153 sends a success code to the host.

Figure 11:
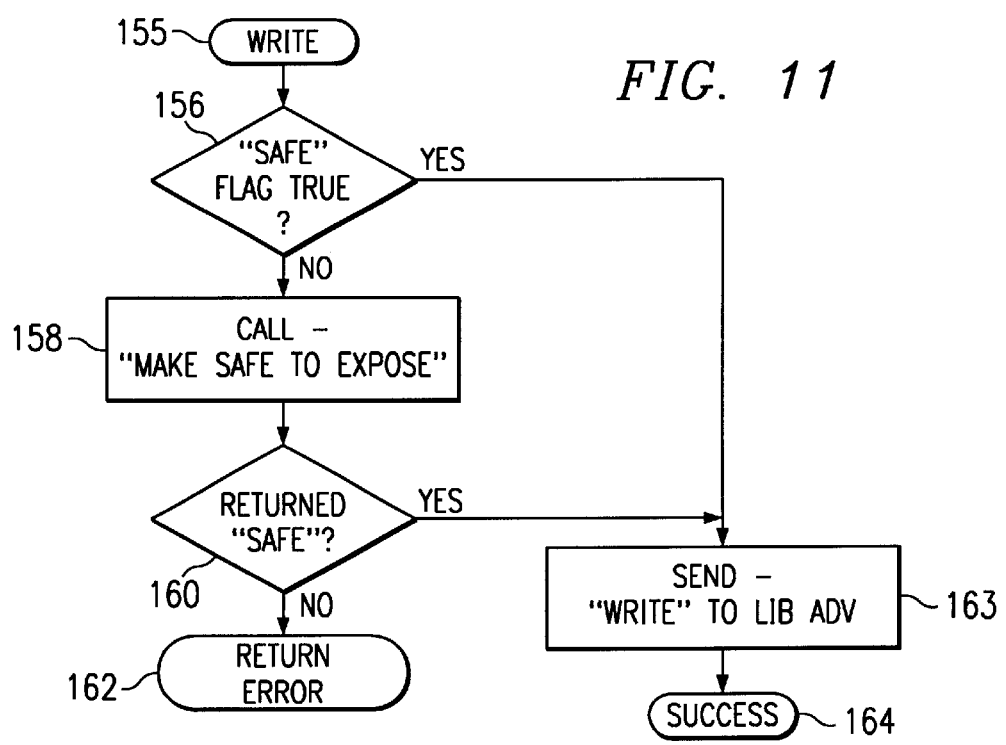

Once the data volume requested by the host has been mounted, the host may provide a command to update that data volume in a "write" command 155 in FIG. 11. The director detects, in step 156, whether a "safe" flag in column 95 of FIG. 7 is true. The "safe" flag will be discussed hereinafter. If the "safe" flag is not true, "NO", step 158 calls a "make safe to expose" module of the director, in accordance with the present invention.

As will be explained, the "make safe to expose" module will either return that it is safe to conduct the write command, or that it is not safe. Step 160 determines whether the return was "safe". If not, step 162 returns an error code to the host. If the return is determined to be "safe" in step 160, or if the "safe" tag was true in step 156, the data volume may be updated on a "fail-safe" basis. Thus, step 163 sends the "write" command to the advancing library, and step 164 provides a success signal to the host.

Figure 12:
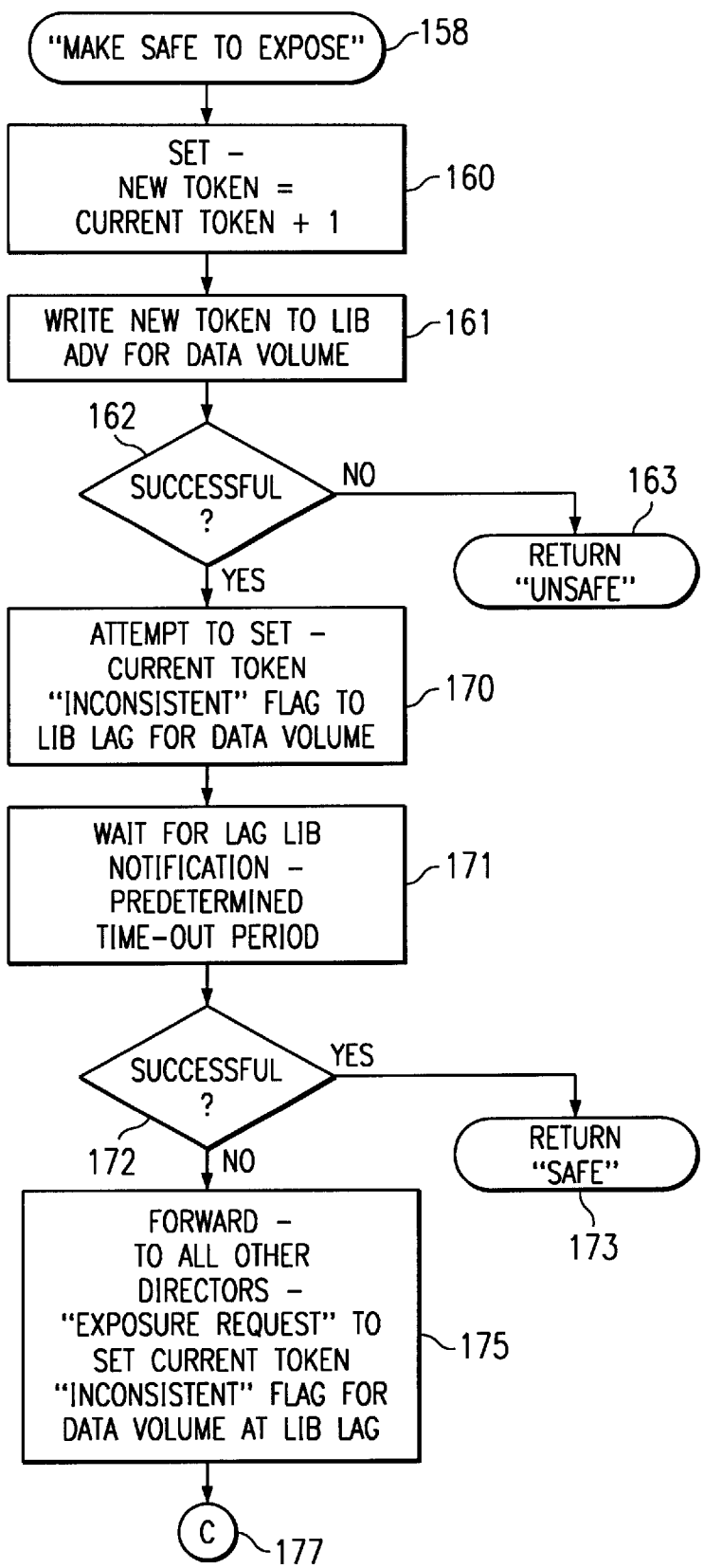

The "make safe to expose" module called in step 158 is depicted in FIGS. 12 and 13. In accordance with the present invention, the "make safe to expose" module attempts to set an "inconsistent" flag to the current synchronization token directly associated with the potentially down level copies of the data volume on each lagging library, first, by the initiating director, then, by any other director. Upon all of the other directors responding to the initiating director in the flag notification receiving step, and upon the other directors indicating failure to set the "inconsistent" flag at the lagging library, the initiating director lists the volume and a new synchronization token as an entry in the "hot token" list at the initiating director. The initiating director provides a "safe" response, allowing updating the data volume only if the initiating director has received the notification of posting the "inconsistent" flag for all of the lagging libraries, or the new token has been listed in the "hot token" list at the initiating director.

In step 160, the initiating director internally sets the new synchronization token to the value of the current token+1. The initiating director then, in step 161, attempts to write the new token to the advancing library. Step 162 determines whether the advancing library 14–15 set the new synchronization token directly associated with the data volume at column 56 of the respective table 60 or 61 in FIGS. 4A or 4B. If not successful, the module returns "unsafe" in step 163.

If successful, the initiating director, in step 170, attempts to set the an "inconsistent" flag 80 or 81 to the current token 66 of the table 61 or 62 of FIGS. 4A or 4B, of the lagging library for the data volume, indicating that the copies of the data volume at the lagging libraries are potentially down level copies. In step 171, the initiating director waits for a response from the lagging library, or libraries, for a predetermined time-out period. Step 172 determines whether the initiating director has received notification from each of the lagging libraries, within the predetermined time-out period, that the "inconsistent" flag has been set for the data volume, and, if so, step 173 returns "safe", and the initiating director sets the "safe" flag in column 95 of table 90 of FIG. 7.

Upon the initiating director, e.g., director 71, as the result of the lagging library notification receiving step 172, failing to receive the notification from any of the lagging libraries, forwards to all of the other directors available to the initiating director, e.g., directors 72–74, in step 175, an "exposure request" to set the current token and the "inconsistent" flag for the volume at any lagging library from which no notification has been received. The process then proceeds, via connector 177, to FIG. 13. In step 178, the initiating director waits a predetermined time-out period to receive notification from the other directors of any successful setting or of failure to set the "inconsistent" flag of the current synchronization token for the data volume for the lagging libraries for which no notification had been received by the initiating director.

Step 180 determines whether any other director, or directors, have responded that the "inconsistent" flag was set for the data volume at the lagging library. If so, the initiating director returns "safe" in step 181.

If the other directors have not responded that the "inconsistent" flag was set, step 182 determines whether all of the other directors have responded within the predetermined time-out period of step 178. If not all of the directors have responded, e.g., if communication was lost with one of the directors, the initiating director returns "unsafe" in step 185.

Upon all of the other directors responding to the initiating director in the flag notification receiving step 182, and upon the other directors indicating failure to set the "inconsistent" flag at the lagging library in step 180, the initiating director lists the volume and a new token as an entry in the "hot token" list 85 of FIG. 6 at the initiating director in step 190. The module then returns "safe" in step 191.

The initiating director thus allows updating only the data volume for which the initiating director has received the notification of posting the "inconsistent" flag for all of the lagging libraries, or the new token has been listed in the "hot token" list at the initiating director.

FIG. 14 depicts each of the other directors responding to the "exposure request" of step 175 from the initiating director. As discussed above, the directors may communicate either directly or indirectly in accordance with the Dahman et al. application. Upon receiving the forwarded request to set the "inconsistent" flag for the volume at any lagging library from which no notification has been received, the director calls a "conditional token set" module, in step 200, for the lagging library. The module attempts to set an "inconsistent" flag to the current token for the data volume, if needed, on the lagging library, as will be explained hereinafter.

In step 201, the director receives notification of any successful setting of the current token "inconsistent" flag for the data volume by the lagging library, within a predetermined time-out period of step 200. If step 201 indicates that the "inconsistent" token was set in the lagging library, the other director responds to the initiating director in step 202 indicating success, and waits for the next message in step 203.

Upon step 201 indicating that the director failed to receive the notification from the lagging library, the other director, in step 205, lists the volume and the new synchronization token as an entry in a "hot token" list at the other director. Then, in step 206, the other director then responds to the initiating director, sending notification of failure to set the current token "inconsistent" flag of the lagging library for which no notification had been received by the initiating director within the predetermined time-out period, and that the data volume and lagging library have been added to its "hot token" list. In step 207, the other director then waits for the next message.

Thus, no data volume will be updated unless and until the data volume is identified as "inconsistent" at all lagging libraries, or is on the "hot list" of each director.

Figure 15:
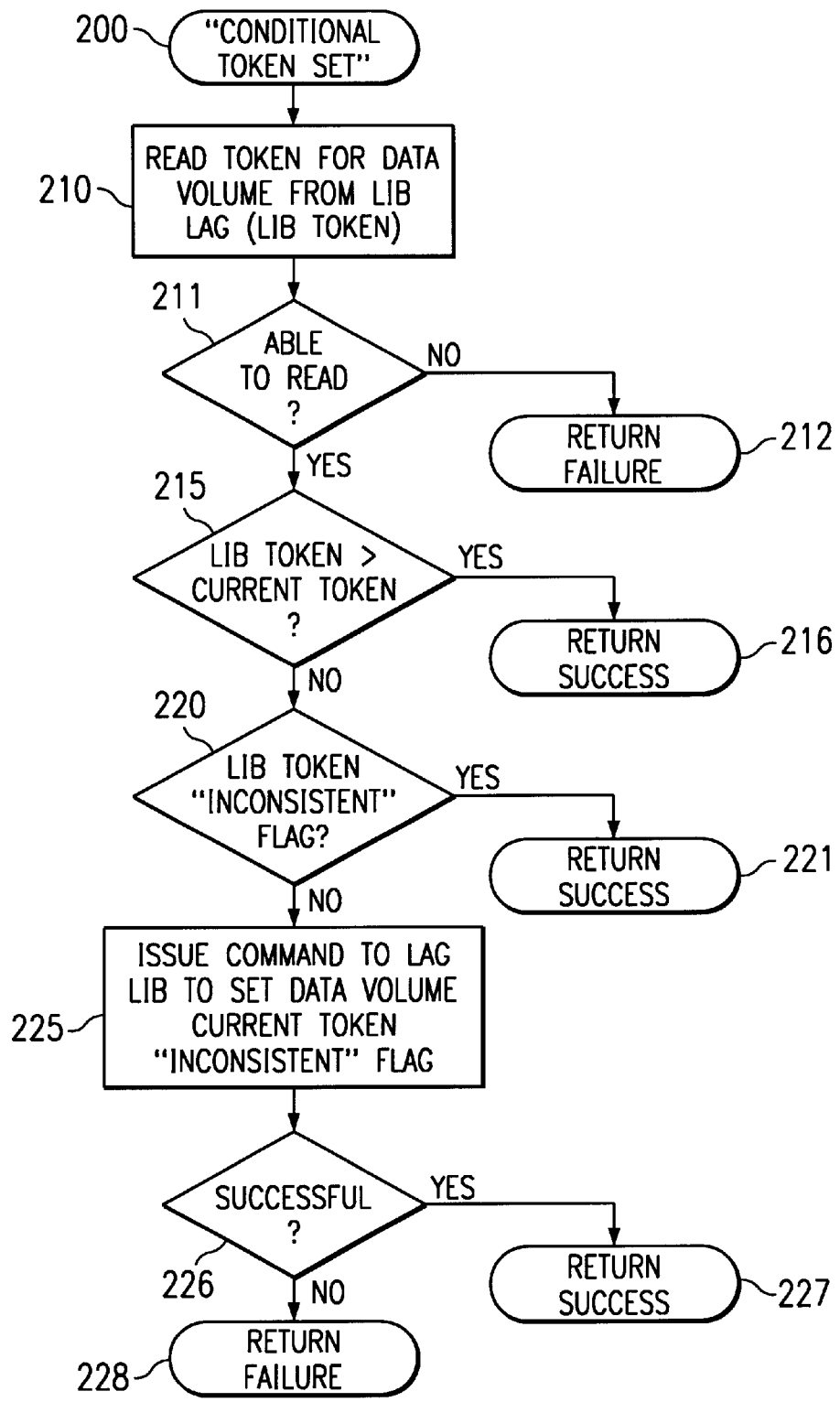

The "conditional token set" module is depicted in FIG. 15. The process sets the current token "inconsistent" flag only if needed.

In step 210, the other director attempts to read the token for the data volume from the lagging library. Step 211 determines whether the director was able to read the token and associated flags. If step 211 indicates that the token was not read, step 212 returns a failure code. If the token was read, "YES" in step 211, step 215 determines whether the library token is at a greater value than the current token. If the library token is greater, there is no need to set an "inconsistent" flag because the data volume is more current than the data volume at the time that the "conditional token set" module was requested. This means that the data volume was updated in a different manner. Thus, the module returns success in step 216.

However, if step 215 indicates that the library token is either equal to or less than the current token, "NO", step 220 determines whether the "inconsistent" flag has been set, e.g., by another director. If so, the module returns success in step 221.

If steps 215 and 220 indicate that the library token is potentially down level and the "inconsistent" token is not set, the "inconsistent" token must be set. Thus, the director, in step 225, provides a command to the lagging library to attempt to set the library current token "inconsistent" flag. Again, a time-out period may be applied. Step 226 determines whether the command was successful. If so, step 227 returns success, and, if not, step 228 returns a failure code.

Figure 16:
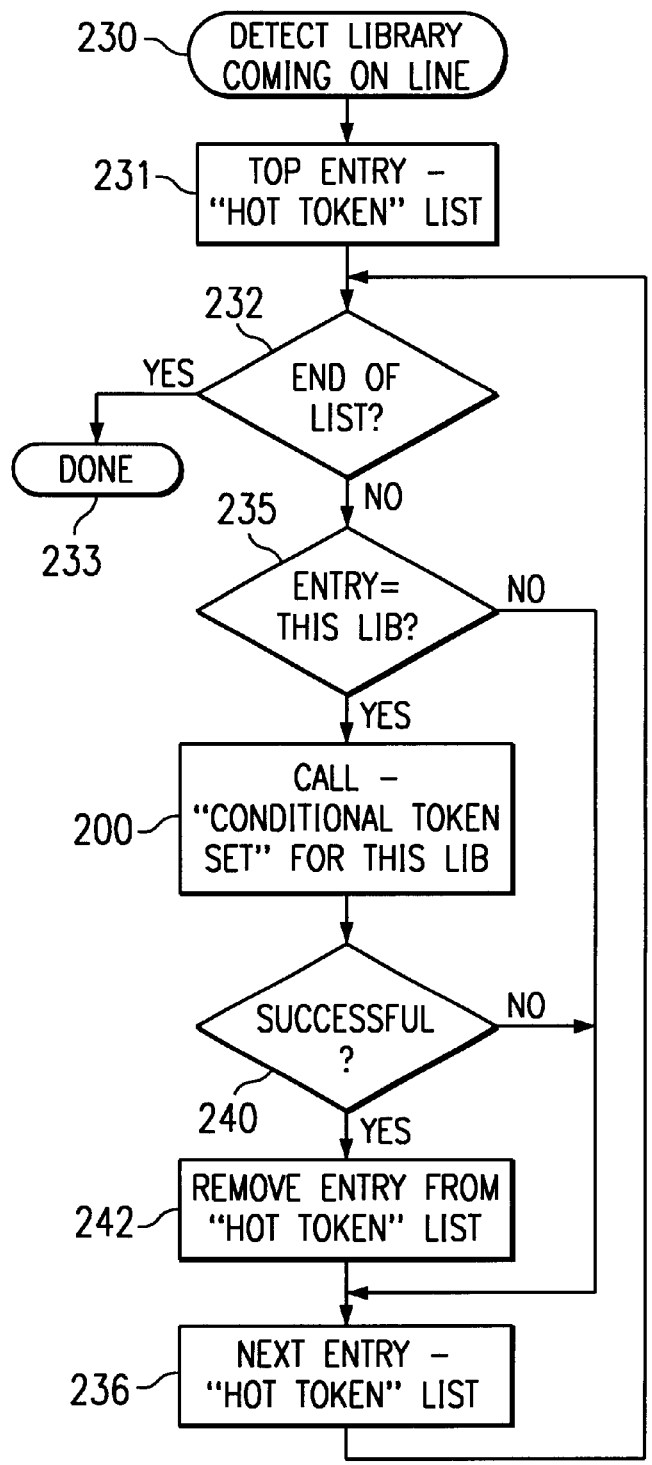

Failure to set the "inconsistent" flag at a lagging library may be because the library has failed or gone out of communication with the directors. FIG. 16 depicts the process conducted by each director when the director detects, in step 230, that a library has come back on line, either because the library failure has been corrected or because the communication between the director and the library has been reestablished.

In step 231, the top entry of the "hot token" list of the director is accessed. Step 232 determines whether there is no entry and the end of the list has been reached, and, if so, the process is completed at step 233. If step 232 indicates that the end of the list has not been reached, step 235 determines whether the entry is for the library that has just come on line. If the entry is for another library, step 236 returns to access the next entry on the "hot token" list.

If the entry is for the library that has just come on line, step 200 calls the "conditional token set" module of FIG. 15 for the library. Step 240 determines whether the "conditional token set" was successful. If not, the entry remains in the "hot token" list, and step 236 again cycles back to the next entry in the list. If the "conditional token set" was successful, the entry, in step 242, is removed from the "hot token" list, and step 236 cycles back to the next entry in the list. Upon completion of the review of the "hot token" list, as determined by step 232, the process is complete in step 233.

Thus, the library just coming back on line has been reviewed for all of the data volumes which were on the "hot token" list for the director. If the library just came back on line with respect to other directors, their "hot token" lists are also reviewed. Thus, all data volumes which are down level or were potentially down level have been provided with the current token on the "hot token" list and have had the "inconsistent" flag set. If any of the data volumes were not down level, the "conditional token set" process did not set the "inconsistent" flag.

Figure 17:
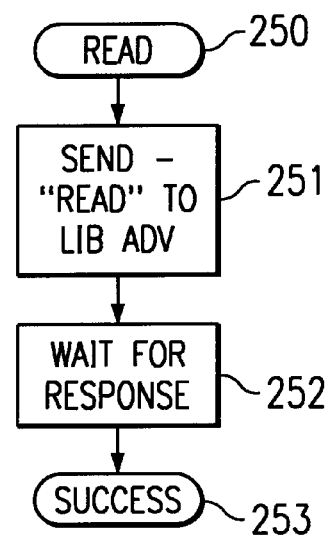

The "read" process 250 is depicted in FIG. 17, and is conducted after a mount process of FIGS. 8–10 was successfully conducted. The mount process has determined that the data volume is the most current. The data volume will not be updated during the read process. Thus, there is no need to call the "safe to expose" module. Hence, the initiating director sends, in step 251, the "read" command to the advancing library, and, in step 252, waits for a response, signaling success in step 253.

Figure 18:
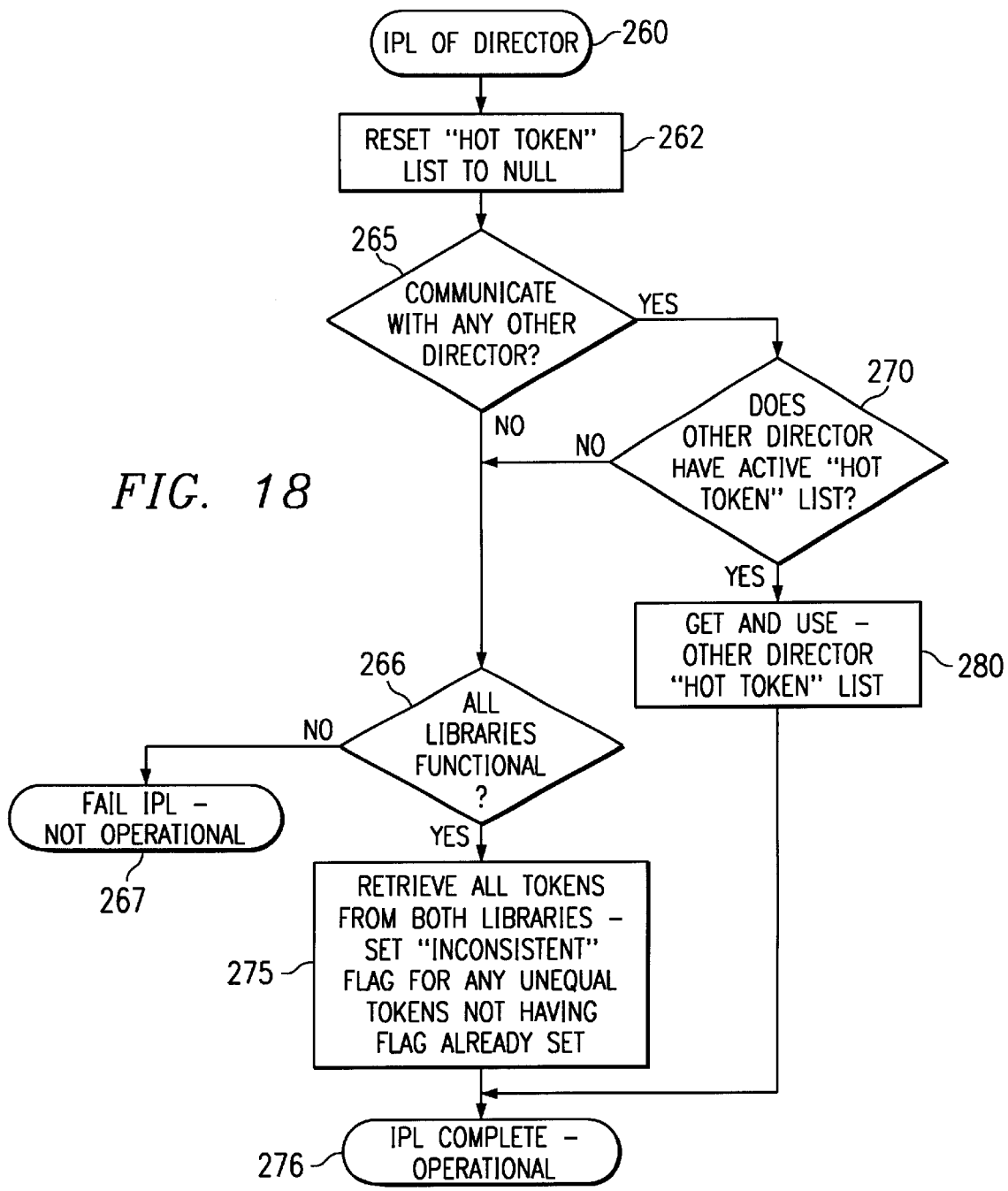

The process for bringing a director on line is depicted at step 260 in FIG. 18 as an IPL. If the director had a "hot token" list, it may now be invalid. Therefore, step 262 resets the "hot token" list for the director to null. The "hot token" list must then be established in order to insure that no down level data volumes are selected. Thus, step 265 determines whether the director can communicate with any other director. If not, the "inconsistent" tokens can be utilized to make a new "hot token" list. Thus, step 266 determines whether all the libraries 14–15 are functional, meaning that they are both operational and in communication with the director. If not, the IPL has failed in step 267.

If step 265 determines that the director is able to communicate with at least one other director, step 270 determines whether the other director has a "hot token" list. If not, step 266 again determines whether all the libraries are functional. If so, step 275 retrieves all tokens from both (all) libraries for every data volume, and the tokens are compared. This is an extensive process that would have to be conducted without the present invention any time it was desired to insure that there is no potentially down level data volume. Then, an "inconsistent" flag is set in the "hot token" list for the director for any unequal tokens not already having the "inconsistent" flag set. The IPL is then complete in step 276.

However, if step 270 determines that the other director has an active "hot token" list, step 280 retrieves the "hot token" list from the other director or directors and is employed as the "hot token" list for the IPL director.

The director is thus provided with the most current "hot token" list, and is able to insure that only data volumes that are identified as "inconsistent" at all lagging libraries, or are on the "hot list" of the director are updated.

As the result of the present invention, no data volume will be updated unless and until the data volume is identified as "inconsistent" at all lagging libraries, or is on the "hot list" of each director.

While the preferred embodiments of the present invention have been illustrated in detail, it should be apparent that modifications and adaptations to those embodiments may occur to one skilled in the art without departing from the scope of the present invention as set forth in the following claims.

We claim:

1. A data storage library subsystem for identifying most recent redundant copies of identifiable data volumes stored in a plurality of data storage libraries, wherein, at least one of said redundant copies may be initially updated with respect to other of said redundant copies, said identifiable data volumes accessible in said plurality of data storage libraries, the one of said data storage libraries first updating said copy comprising an advancing library, and the later of said data storage libraries updating said copy each comprising a lagging library, said identifiable data volumes each directly associated with an updatable synchronization token, said synchronization token indicating relative update levels of said directly associated redundant copies, said data storage libraries coupled to a plurality of directors, and said copies and said directly associated synchronization tokens may be unavailable to said directors at various times, said data storage library subsystem comprising:

a plurality of directors, each separate from and coupled to each said data storage library, and each in communication with each other of said plurality of directors; and one of said plurality of directors comprising an initiating director for updating said redundant copies of a selected identifiable data volume, wherein said initiating director responding to a command to update said selected identifiable data volume, attempts to set an "inconsistent" flag to a current said synchronization token directly associated with potentially down level copies of said data volume on each of said lagging libraries;

said initiating director receives notification that said current synchronization token "inconsistent" flag has been set by any of said lagging libraries within a predetermined time-out period; upon failing to receive said notification from any said lagging library, said initiating director forwards to each other of said plurality of directors in said communication with said initiating director, a request for said each other director to attempt to set said current synchronization token "inconsistent" flag directly associated with said data volume at any said lagging library from which no notification has been received of said successful setting of said current synchronization token "inconsistent" flag directly associated with said data volume;

said initiating director receives, from said other directors, notification of any successful setting and of failure to set said current synchronization token "inconsistent" flag of said lagging libraries for which no said notification had been received within a predetermined time-out period;

upon all of said other directors responding to said initiating director, and upon all of said other directors indicating failure to set said "inconsistent" flag at any said lagging library, said initiating director lists said volume, and a new synchronization token as an entry in a "hot token" list; and said initiating director lists only said data volume for which said initiating director has received said notification of setting said "inconsistent" flag for all of said lagging libraries, or said new synchronization token has been listed in said "hot token" list at said initiating director.

2. The subsystem of claim 1, wherein said initiating director additionally, upon failure to receive said flag notification from any of said other directors, failing to update said data volume, and, instead, provides an error signal.

3. The subsystem of claim 2, wherein said others of said directors:

upon receiving from said initiating director said forwarded request to set said current synchronization token and said "inconsistent" flag directly associated with said volume at any said lagging library from which no notification has been received, attempt to set said current synchronization token "inconsistent" flag directly associated with said data volume on said lagging library;

receive notification of any successful setting of said current synchronization token "inconsistent" flag by said lagging library within a predetermined time-out period;

upon failing to receive said notification from said lagging libraries, list said data volume and said new synchronization token as an entry in a "hot token" list at said other director; and responding to said initiating director, send notification to said initiating director of any successful setting and of failure to set said current synchronization token "inconsistent" flag of said lagging library for which no said notification had been received by said initiating director within said predetermined time-out period.

4. The subsystem of claim 3, wherein each said director, additionally:

upon detecting any of said data storage libraries becoming available to said director, reads said "hot token" list of said director for an entry for said available data storage library;

attempts to set a "conditional" token "inconsistent" flag from said entry of said "hot token" list for said data volume on said available data storage library;

receives notification of any successful response to said "conditional" token "inconsistent" flag for said data volume by said available data storage library within a predetermined time-out period; and upon receiving said successful response notification from said available data storage library, deleting said entry of said data volume and said new synchronization token in said "hot token" list at said director.

5. The subsystem of claim 4, wherein each said director sets said "conditional" token:

comparing said synchronization token directly associated with said data volume of said available data storage library to said synchronization token of said "hot token" list entry for said data volume;

upon said synchronization token directly associated with said data volume of said available data storage library being more recent than said synchronization token of said "hot token" list entry, deletes said "hot token" list entry;

upon said synchronization token "inconsistent" flag directly associated with said data volume of said available data storage library being set, deleting said "hot token" list entry;

upon said synchronization token directly associated with said data volume of said available data storage library equalling or lagging said synchronization token of said "hot token" list entry, and said "inconsistent" flag directly associated with said data volume of said available data storage library not being set, attempts to set said current synchronization token "inconsistent" flag directly associated with said data volume on said available library;

receives notification of any successful setting of said current synchronization token "inconsistent" flag by said available library, within a predetermined time-out period; and upon receiving said notification from said available library, deletes said "hot list" entry.

6. A method for identifying most recent redundant copies of identifiable data volumes stored in a plurality of data storage libraries, wherein, at least one of said redundant copies may be initially updated with respect to other of said redundant copies, said identifiable data volumes accessible in said plurality of data storage libraries, the one of said data storage libraries first updating said copy comprising an advancing library, and the later of said data storage libraries updating said copy each comprising a lagging library, said identifiable data volumes each directly associated with an updatable synchronization token, said synchronization token indicating relative update levels of said directly associated redundant copies, said data storage libraries coupled to a plurality of directors, and said copies and said directly associated synchronization tokens may be unavailable to said directors at various times, said method comprising the steps of:

in response to a command to update a data volume, attempting to set, by an initiating one of said directors, an "inconsistent" flag to a current said synchronization token directly associated with potentially down level copies of said data volume on each of said lagging libraries;

receiving, at said initiating director, notification that said current synchronization token "inconsistent" flag has been set by any of said lagging libraries within a predetermined time-out period;

upon said initiating director failing to receive said notification from any of said lagging libraries, forwarding to each other director available to said initiating director, a request for said other director to attempt to set said current synchronization token "inconsistent" flag directly associated with said data volume at any said lagging library from which no notification has been received;

receiving, at said initiating director, notification from said other directors of any successful setting and of failure to set said current synchronization token "inconsistent" flag of said lagging libraries for which no said notification had been received by said initiating director within a predetermined time-out period;

upon all of said other directors responding to said initiating director in said other director flag notification receiving step, and upon all of said other directors indicating failure to set said "inconsistent" flag at any said lagging library, said initiating director listing said volume and a new synchronization token as an entry in a "hot token" list at said initiating director; and updating only said data volume for which said initiating director has received said notification of setting said "inconsistent" flag for all of said lagging libraries, or said new synchronization token has been listed in said "hot token" list at said initiating director.

7. The method of claim 6, additionally comprising, in said other director flag notification receiving step, upon failure to receive said notification from any of said other directors, canceling said data volume updating step, and, instead, providing an error signal.

8. The method of claim 7, additionally comprising the steps of, in said each other director:

upon receiving from said initiating director said forwarded request to set said current synchronization token "inconsistent" flag directly associated with said data volume at any said lagging library from which no notification has been received, attempting to set said current synchronization token "inconsistent" flag directly associated with said data volume on said lagging library;

receiving notification of any successful setting of said current synchronization token "inconsistent" flag by said lagging library within a predetermined time-out period;

upon said lagging library notification receiving step failing to receive said notification from said lagging library, listing said data volume and said new synchronization token as an entry in a "hot token" list at said other director; and responding to said initiating director, sending notification of any successful setting and of failure to set said current synchronization token "inconsistent" flag of said lagging library for which no said notification had been received by said initiating director within said predetermined time-out period.

9. The method of claim 8, additionally comprising the steps of, in said initiating and said each other director:

upon detecting any of said data storage libraries becoming available to said director, reading said "hot token" list of said director for an entry for said available data storage library;

attempting to set a "conditional" token "inconsistent" flag from said entry of said "hot token" list for said data volume on said available data storage library;

receiving notification of any successful response to said "conditional" token "inconsistent" flag for said data volume by said available data storage library within a predetermined time-out period; and upon said available library notification receiving step receiving said successful response notification from said available data storage library, deleting said entry of said data volume and said new synchronization token in said "hot token" list at said director.

10. The method of claim 9, wherein said steps of attempting to set a "conditional" token, receiving said notification, and deleting said entry comprise the steps of:

comparing said synchronization token directly associated with said data volume of said available data storage library to said synchronization token of said "hot token" list entry for said data volume;

upon said synchronization token directly associated with said data volume of said available data storage library being more recent than said synchronization token of said "hot token" list entry, deleting said "hot list" entry;

upon said synchronization token "inconsistent" flag directly associated with said data volume of said available data storage library being set, deleting said "hot token" list entry;

upon said synchronization token directly associated with said data volume of said available data storage library equalling or lagging said synchronization token of said "hot token" list entry, and said "inconsistent" flag directly associated with said data volume of said available data storage library not being set, attempting to set said most recent synchronization token "inconsistent" flag directly associated with said data volume on said available library;

receiving notification of any successful setting of said current synchronization token "inconsistent" flag by said available library within a predetermined time-out period; and upon said available library notification receiving step receiving said notification from said available library, deleting said "hot list" entry.

11. A computer program product usable with a plurality of programmable computer processors having computer readable program code embodied therein, said programmable computer processors each at a corresponding plurality of directors, for identifying most recent redundant copies of identifiable data volumes stored in a plurality of data storage libraries, wherein, at least one of said redundant copies may be initially updated with respect to other of said redundant copies, said identifiable data volumes accessible in said plurality of data storage libraries, the one of said data storage libraries first updating said copy comprising an advancing library, and the later of said data storage libraries updating said copy each comprising a lagging library, said identifiable data volumes each directly associated with an updatable synchronization token, said synchronization token indicating relative update levels of said directly associated redundant copies, said data storage libraries coupled to a plurality of directors, and said copies and said directly associated synchronization tokens may be unavailable to said directors at various times, said computer readable program code causing:

said programmable computer processors to, in response to a command to update a data volume, attempt to set, by an initiating one of said directors, an "inconsistent" flag to a current said synchronization token directly associated with potentially down level copies of said data volume on each of said lagging libraries;

said programmable computer processor at said initiating director, to receive notification that said current synchronization token "inconsistent" flag has been set by any of said lagging libraries within a predetermined time-out period;

said programmable computer processor at said initiating director, upon failing to receive said notification from any said lagging library, to forward to each other director available to said initiating director, a request for said each other director to attempt to set said current synchronization token "inconsistent" flag directly associated with said data volume at any said lagging library from which no notification has been received of said successful setting of said current token and "inconsistent" flag for said volume;

said programmable computer processor at said initiating director, to receive notification from said other directors of any successful setting and of failure to set said current synchronization token "inconsistent" flag of said lagging libraries for which no said notification had been received by said initiating director within a predetermined time-out period;

said programmable computer processor at said initiating director, upon all of said other directors responding to said initiating director, and upon all of said other directors indicating failure to set said "inconsistent" flag at any said lagging library, to list said volume and a new synchronization token as an entry in a "hot token" list at said initiating director; and said programmable computer processor at said initiating director, to update only said data volume for which said initiating director has received said notification of setting said "inconsistent" flag for all of said lagging libraries, or said new synchronization token has been listed in said "hot token" list at said initiating director.

12. The computer program product of claim 11, wherein said computer readable program code which causes said programmable computer processor at said initiating director to receive said flag notification, additionally comprises, upon failure to receive said flag notification from any of said other directors, to fail to update said data volume, and, instead, to provide an error signal.

13. The computer program product of claim 12, wherein said computer readable program code which causes said programmable computer processor at said others of said directors:

upon receiving from said initiating director said forwarded request to set said current synchronization token "inconsistent" flag directly associated with said data volume at any said lagging library from which no notification has been received, to attempt to set said current synchronization token "inconsistent" flag directly associated with said data volume on said lagging library;

to receive notification of any successful setting of said current synchronization token "inconsistent" flag by said lagging library, within a predetermined time-out period;

upon failing to receive said notification from said lagging libraries, to list said data volume and said new synchronization token as an entry in a "hot token" list at said other director; and to respond to said initiating director, sending notification to said initiating director of any successful setting and of failure to set said current synchronization token "inconsistent" flag of said lagging library for which no said notification had been received by said initiating director within said predetermined time-out period.

14. The computer program product of claim 13, wherein said computer readable program code which causes said programmable computer processor at each of said directors, additionally, to:

upon detecting any of said data storage libraries becoming available to said director, read said "hot token" list of said director for an entry for said available data storage library;

attempt to set a "conditional" token "inconsistent" flag from said entry of said "hot token" list for said data volume on said available data storage library;

receive notification of any successful response to said "conditional" token "inconsistent" flag for said data volume by said available data storage library within a predetermined time-out period; and upon receiving said successful response notification from said available data storage library, delete said entry of said data volume and said new synchronization token in said "hot token" list at said director.

15. The computer program product of claim 14, wherein said computer readable program code which causes said programmable computer processor at each of said directors to set said "conditional" token:

to compare said synchronization token directly associated with said data volume of said available data storage library to said synchronization token of said "hot token" list entry for said data volume;

upon said synchronization token directly associated with said data volume of said available data storage library being more recent than said synchronization token of said "hot token" list entry, to delete said "hot token" list entry;

upon said synchronization token and said "inconsistent" flag directly associated with said data volume of said available data storage library being set, to delete said "hot token" list entry;

upon said synchronization token directly associated with said data volume of said available data storage library equalling or lagging said synchronization token of said "hot token" list entry, and said "inconsistent" flag directly associated with said data volume of said available data storage library not being set, to attempt to set said current synchronization token "inconsistent" flag directly associated with said data volume on said available library;

to receive notification of any successful setting of said current synchronization token "inconsistent" flag by said available library within a predetermined time-out period; and upon receiving said notification from said available library, to delete said "hot list" entry.

* * * * *

UNITED STATES PATENT AND TRADEMARK OFFICE
CERTIFICATE OF CORRECTION

PATENT NO. : 6,249,849 B1
DATED : June 19, 2001
INVENTOR(S) : Day, III et al.

It is certified that error appears in the above-identified patent and that said Letters Patent is hereby corrected as shown below:

Column 14,
Line 50, change "lists" to -- updates --

Signed and Sealed this

Ninth Day of September, 2003

JAMES E. ROGAN
*Director of the United States Patent and Trademark Office*